(12) United States Patent
Brown et al.

(10) Patent No.: US 8,588,409 B2
(45) Date of Patent: Nov. 19, 2013

(54) CUSTOM STATIC DIFFIE-HELLMAN GROUPS

(75) Inventors: Daniel R. L. Brown, Mississauga (CA); Robert P. Gallant, Corner Brook (CA); Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 1130 days.

(21) Appl. No.: 11/272,150

(22) Filed: Nov. 14, 2005

(65) Prior Publication Data

US 2007/0071237 A1    Mar. 29, 2007

Related U.S. Application Data

(60) Provisional application No. 60/626,883, filed on Nov. 12, 2004.

(30) Foreign Application Priority Data

Nov. 11, 2004  (WO) ............... PCT/IB2004/003699

(51) Int. Cl.
*G06F 21/00*    (2013.01)

(52) U.S. Cl.
USPC .............................................. 380/30; 380/44

(58) Field of Classification Search
None
See application file for complete search history.

(56) References Cited

U.S. PATENT DOCUMENTS

| | | | |
|---|---|---|---|
| 6,252,959 B1 | 6/2001 | Paar et al. | |
| 6,446,205 B1 | 9/2002 | Lenstra | |
| 6,665,405 B1 * | 12/2003 | Lenstra | 380/28 |
| 6,778,666 B1 * | 8/2004 | Kuzmich et al. | 380/28 |
| 7,308,469 B2 * | 12/2007 | Harley et al. | 708/491 |
| 7,359,507 B2 * | 4/2008 | Kaliski | 380/30 |
| 2002/0055962 A1 | 5/2002 | Schroeppel | |
| 2003/0028771 A1 | 2/2003 | Kocher et al. | |

FOREIGN PATENT DOCUMENTS

| | | |
|---|---|---|
| JP | 8-504962 A | 5/1996 |
| JP | 2003-233306 A | 8/2003 |
| WO | WO 01/35573 A1 | 5/2001 |

OTHER PUBLICATIONS

Menezes, A. et al.; Handbook of Applied Cryptography; 1996; Chapter 4: Public-Key Parameters; pp. 133 to 168; CRC Press, Boca Raton, Florida; ISBN: 978-0-8493-8253.

(Continued)

*Primary Examiner* — Philip Chea
*Assistant Examiner* — Carlton Johnson
(74) *Attorney, Agent, or Firm* — John R. S. Orange; Blake, Cassels & Graydon LLP

(57) ABSTRACT

Methods for choosing groups for a static Diffie-Hellman key agreement protocol to inhibit active attacks by an adversary are provided. In mod p groups, an even h is chosen of value approximately $(9/16)(\log_2 n)^2$, values r and n are determined using sieving and primality testing on r and n, and a value t is found to compute $p=tn+1$ wherein p is prime. In elliptic curve groups defined over a binary filed, a random curve is chosen, the number of points on the curve is counted and this number is checked for value of 2n wherein n is prime and n−1 meets preferred criteria. In elliptic curve groups defined over a prime field of order q, a value $n=hr+1$ is computed, wherein n is prime and n−1 meets preferred criteria, and a complex multiplication method is applied on n to produce a value q and an elliptic curve E defined over q and having an order n.

33 Claims, 4 Drawing Sheets

(56) References Cited

OTHER PUBLICATIONS

Knuth, D.; The Art of Computer Programming; 1997; Seminumerical algorithms: Section 4.5.4. "Factoring into Primes"; pp. 379 to 415; vol. 2; Addison Wesley; ISBN: 978-0-201-89684-8.

Chaum, D.; "Undeniable Signatures"; Advances in Cryptology—CRYPTO '89 Proceedings; LNCS; vol. 35; 1990; pp. 212 to 216; retrieved from www.spingerlink.com/content/rttxwq36m7454evd.

Brown, D. R. L. et al.; "The Static Diffie-Hellman Problem"; Jun. 23, 2005; ePrint 2004/306; IACR; http://eprint.iacr.org/2004/306.

De Felice, M.; Supplementary partial search report from corresponding European Application No. 05801157.8; search completed Apr. 28, 2011; report dated May 10, 2011.

Menezes, A. et al.; Handbook of Applied Cryptography; 1996; Chapter 8: Public-Key Encryption; pp. 283 to 319; CRC Press, Boca Raton, Florida; ISBN: 978-0-8493-8253; http://cacr.uwaterloo.ca/hac/.

Ford, W. et al.; "Server-Assisted Generation of a Strong Secret from a Password"; Proceedings of the IEEE 9th International Workshops on Enabling Technologies: Infrastructure for Collaborative Enterprises; Jun. 2000; pp. 176 to 180; IEEE Computer Society; Washington, DC, U.S.A.

Maurer, U.; "Towards the Equivalence of Breaking the Diffie-Hellman Protocol and Computing Discrete Logarithms"; Advances in Cryptology—Crypto'94; Aug. 1994; pp. 271 to 281; vol. 839; LNCS.

Brown, D. R. L. et al.; "The Static Diffie-Hellman Problem"; Nov. 15, 2004; ePrint 2004/306; IACR; http://eprint.iacr.org/2004/306.

\* cited by examiner

CUSTOM STATIC DIFFIE-HELLMAN GROUPS

This application claims priority from PCT Application No. PCT/IB2004/003699 filed Nov. 11, 2004 and U.S. Provisional Patent Application No. 60/626,883 filed Nov. 12, 2004.

FIELD OF THE INVENTION

The present invention relates to static groups in the field of cryptography.

DESCRIPTION OF THE PRIOR ART

Public key cryptography, as introduced in 1975 by Diffie and Hellman, made possible, among other things, confidential communication without pre-shared secrets and digital signatures with non-repudiation properties.

The most ingenious aspect of the Diffie-Hellman (DH) protocol for public key cryptography was to use a mathematical structure called a group, in which a certain problem, the discrete logarithm problem, was intractable.

A group is merely a set of elements and a single operation that acts on any two elements. Familiar examples of groups include: the integers (including zero and negative integers) under the operation of addition, rational numbers under the operation of addition, and non-zero rational numbers under the operation of multiplication. These familiar examples are infinite groups, but there also exist finite (or discrete) groups. Cryptographers have generally been more interested in finite groups, partly because the group elements can be communicated with a fixed number of bits. Examples of finite groups are generally well known in the field.

The most familiar example is groups based on modular arithmetic. If p is prime number and t is any integer, then t mod p is the remainder of t divided by p. So if t=pq+r for some integer q, and r is between 0 and p−1 inclusive, then r=t mod p. The set of integers from 0 to p−1 inclusive form a group under the operation of modular addition, in which s and t are combined to become s+t mod p. This group is denoted by $Z_p$. More generally, p can be any integer.

The set of integers from 1 to p−1 inclusive, forms another group under the operation of modular multiplication, in which s and t are combined to become st mod p. This group is denoted $Z_p^*$, is often called a mod p group. More generally, p can be any power of a prime with a slightly different operation. When writing the operation for these groups, the notation mod p is often omitted if it is clear from context.

A subgroup of a group G is a group that is also a subset of the elements in G and has the same operation as G. The group $Z_p^*$, for example, has a subgroup of order 2 whose elements are 1 and p−1. More generally, for any element g of a group, there is a smallest subgroup, denoted <g>, containing <g> elements. It is known that <g> is given precisely by the set of elements $g^x$ for integers x, where $g^x$ means the product of x copies of g. In groups with additive notation, such as $Z_p$, the power $g^x$ is instead written as xg. The element g is a generator for <g>. A group is cyclic if it has a generator, so <g> is cyclic by nature. The groups $Z_p$ and $Z_p^*$ are also cyclic, but in general, groups do not have to be cyclic.

The order of the group is the number of elements. The group $Z_p$ has order p and the group $Z_p^*$ has order p−1. The order of an element g is the order of the subgroup <g>. It will be assumed that g has order n.

In groups where the operation is written as multiplication, the discrete logarithm problem may be stated as: given g and w, find an integer x such that $w=g^x$, where $g^x$ means the product of x copies of g. This problem is usually asked for the case where such an integer x exists, which is to say that w is an element of <g>. The general logarithm problem does not require x to be an integer, and can only be defined when the group has additional properties where non-integer powers can be defined.

In some discrete groups, the discrete logarithm problem (DLP) is hard to solve. Diffie and Hellman exploited the fact that the DLP is "hard", to provide the first viable solution for public-key cryptography. In this case, Alice chooses a random integer x, sends Bob a group element $g^x$, Bob chooses a random integer y, and sends Alice a group element $g^y$. Next, Alice computes $z=(g^y)^x$ and Bob computes $z=(g^x)^y$. Clearly $z=z'=g^{xy}=g^{yx}$, so Alice and Bob can compute the same value. If nobody else can compute z, then Alice and Bob have agreed on a shared secret. The shared secret can then be used to encrypt messages communicated between Alice and Bob. This protocol is the Diffie-Hellman key agreement protocol. Before this protocol, Alice and Bob would have to meet first to agree on z in secrecy. This protocol saves Alice and Bob from having to meet first.

This is called public key cryptography because the values $g^x$ and $g^y$ are public. They are called the public keys, and x and y are called the private keys. The pair (x, $g^x$) is the called the key pair. An adversary Eve gets to see the public keys. If Eve can solve the DLP, then she can find x from g and $g^x$. With x, Eve can compute z in the same way as Alice, namely using the public key $g^y$ of Bob and the private key x of Alice. The shared secret is therefore not a secret, and Eve can use this to decrypt the encrypted messages that Alice and Bob send each other. Therefore, a prerequisite for the security of the Diffie-Hellman key agreement protocol is that the DLP is a "hard" problem. Eve should not be able to solve the DLP.

Fortunately, there exists groups in which cryptographers believe that the DLP is hard. Groups in which the DLP is hard are primarily from two well known classes of the groups, namely subgroups of multiplicative groups of finite fields, and subgroups of elliptic curve groups. Elliptic curve groups have the advantage over other DLP groups of using less bandwidth for transmission and storage of public keys, and enabling faster operations.

Static Diffie-Hellman key agreement is an important variant of Diffie-Hellman key agreement in which one or both of the parties has a key pair that does not change over time. If Alice has a static key pair, then her private key x and public key $g^x$ stays the same for all transactions. An advantage to this is that Alice can have a certificate authority sign her public key $g^x$, then Bob can look up the resulting certificate from a database instead of requesting it from Alice. One application of this is when Bob sends an encrypted email to Alice. Alice does not need to send Bob $g^x$ before he can encrypt the email. Instead, Bob looks up $g^x$ from some database, which could be his address book or else some public directory. A certificate for $g^x$ will further assure Bob that Alice (and only Alice) can decrypt the email.

Diffie-Hellman key agreement, in some of these groups, is commonly used today in the IPSec protocol for protecting Virtual Private Networks (VPN). Diffie-Hellman key agreement, including the static variant, is also an optional feature of commonly used Internet Engineering Task Force (IETF) security protocols such as Transport Layer Security (TLS) (used to secure web sites), Secure Multipurpose Internet Message Extensions (S/MIME) (used to secure email), or Secure Shell (SSH) (used to secure remote logging onto computers). It is therefore desirable to make Diffie-Hellman key agreement as secure as possible.

The security of static Diffie-Hellman key agreement depends on more than just the discrete logarithm being hard. In particular, a method for an adversary to determine Alice's static private key x is by sending Alice a specially chosen public key $g^y$ and obtaining from Alice the resulting shared secret $z=g^{xy}$. In most groups, finding x with this active attack is far easier than solving the discrete logarithm problem directly.

To a person skilled in the art, the above attack is not completely realistic in two aspects. Nevertheless, it is well established that attacks of this nature are important to consider.

Firstly, the victim Alice would not likely reveal a shared secret z to an adversary. However, the purpose of z is to be used, and quantifying the exact way in which z will be used is difficult to define. Any use of z will result in some kind of exposure. Therefore, cryptographers have found it wise to consider chosen ciphertext attacks in which the victim reveals the results of her private key operation. Furthermore, demonstrating resistance to a chosen ciphertext attack means that weaker attacks are also resisted. So to be prudent, cryptographers seek to resist the strongest possible attacks, not just the weakest attacks. Therefore assuming that z will be revealed is both prudent and not entirely unrealistic.

Secondly, in most standardized versions of Diffie-Hellman key agreement, the shared secret z is used only for one purpose, namely to derive a key. To do this, a key derivation function (KDF) is used. Thus Alice will compute k=KDF(z). Key derivation functions are usually chosen as one-way functions, meaning there is no known way of reconstructing z from just k. Therefore, in the above attack it is more likely that Alice will reveal k rather than z to the adversary. However, to work, the attack needs z. The attack cannot be used to find x if Alice only reveals k. Because the KDF is one-way, the attacker cannot recover z from the revealed value of k.

Prior to consideration of the above attack, using a KDF was already known to have some less important security benefits. One of these was that the shared secret z is often distinguishable from random. Because z is distinguishable from random it is not ideal for use as a key. It was not known, however, that z actually leaked any information about x until considering the above attack.

Many protocols and implementations of Diffie-Hellman key agreement are not so strict about using the KDF. In some smart card implementations, the smart card reveals z to the smart card reader, and the smart card reader applies the KDF. In such a system, a malicious smart card reader could use the attack and z values from the smart card to deduce the private key x on the smart card. Some protocols, such as basic ElGamal encryption, Chaum and van Antwerpen's use undeniable signatures that are designed such that the entity Alice reveals z as part of the protocol. These protocols are therefore vulnerable to attack. These two protocols, however, were designed before any benefits of a KDF were known. These protocols can easily be corrected by applying a KDF. In fact, the Diffie-Hellman Augmented Encryption Scheme (DHAES) designed by Bellare and Rogaway, was designed as an improvement of ElGamal that, among other things, applied a KDF to the shared secret z before using it as a key.

Other protocols exist, however, that are not as easily fixed by the addition of a KDF. One such protocol is the Ford-Kaliski key retrieval protocol. In this protocol, the base point g is a function of a client's password, and Alice is a server. The client chooses a random y and sends $g^y$ to Alice. In order for the protocol to work, Alice must reveal for any client with which she does Diffie-Hellman key agreement, the resulting shared secret z. From z, the client derives a static value $g^x$ that is a function of both the client password and the server private key x. The static value $g^x$ is called the retrieved key, or a hardened password, because it is more difficult to guess than an ordinary password. Key retrieval, or password hardening, is the primary purpose of the Ford-Kaliski protocol. The client does this by computing $z^u=g^{xyu}$, where u is such that yu is equivalent to 1 in the exponent space. The protocol does not work if Alice applies a KDF to z because then the client will not be able to recover a static value. An adversary could set up malicious clients to use the values of z to derive Alice's private key x. Because the adversary now knows x, guessing $g^x$ is just as easy as guessing the password g. In particular, the adversary will probably be able to launch a dictionary search to determine the hardened password very quickly. Therefore this attack defeats the main purpose of the Ford-Kaliski protocol.

A completely different aspect is that the static Diffie-Hellman problem is hard More precisely, it is hard to compute $w^x$ from w without knowing the private key x. Taking $w=g^y$ shows that the breaking the static Diffie-Hellman protocol is just as hard as finding x. This seems to be a paradox in light of the above attack, but in fact is not. In the above attack, the adversary is active. The adversary uses the victim to solve Diffie-Hellman problem for $g^y$. This gives the adversary the ability to solve the static Diffie-Hellman problem, which is equivalent to the problem of finding x. More precisely, the static DH problem is almost as hard as finding x, to within a certain factor.

If Alice somehow prevents the attack, say with a KDF, then it remains true that solving the static DH problem is almost as hard as finding x. This provides Alice assurance that nobody can solve the static Diffie-Hellman problem, which means that nobody other than her and Bob, who knows the private key y, can calculate the shared secret z. Results of this nature are known as provable security.

Prior provable security results on the DH problem did not deal with the static variant. Therefore, the prior results did not provide as much assurance to Alice about using her private key. Also, there were no known attacks corresponding to prior security results. The effectiveness of the provable security results on the DH, depends on the choice of the DH group. Therefore it is desirable to use a group in which the DH problem, including the static DH problem, is hard.

It is therefore an object of the present invention to obviate or mitigate the above mentioned disadvantages.

SUMMARY OF THE INVENTION

In one aspect, the present invention provides a method for choosing a mod p group for a static Diffie-Hellman key agreement protocol to inhibit active attacks by an adversary comprising the steps of choosing an even value h, searching for values r and n to satisfy the relationship n=hr+1 where r and n are prime, and searching for a value t to compute p=tn+1 wherein p is prime.

In another aspect, the present invention provides a method for choosing an elliptic curve group defined over a binary field for a static Diffie-Hellman key agreement protocol to inhibit active attacks by an adversary comprising the steps of choosing a random curve, counting the number of points on the curve, and checking that the number of points on the curve is 2n, wherein n is prime and n−1 meets preferred criteria.

In yet another aspect, the present invention provides a method for choosing an elliptic curve group defined over a prime field of order q for a static Diffie-Hellman key agreement protocol to inhibit active attacks by an adversary comprising the steps of computing n=hr+1, wherein n is prime and n−1 meets preferred criteria, and performing a complex multiplication method on n thereby producing a value q and an elliptic curve E defined over q having an order n.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
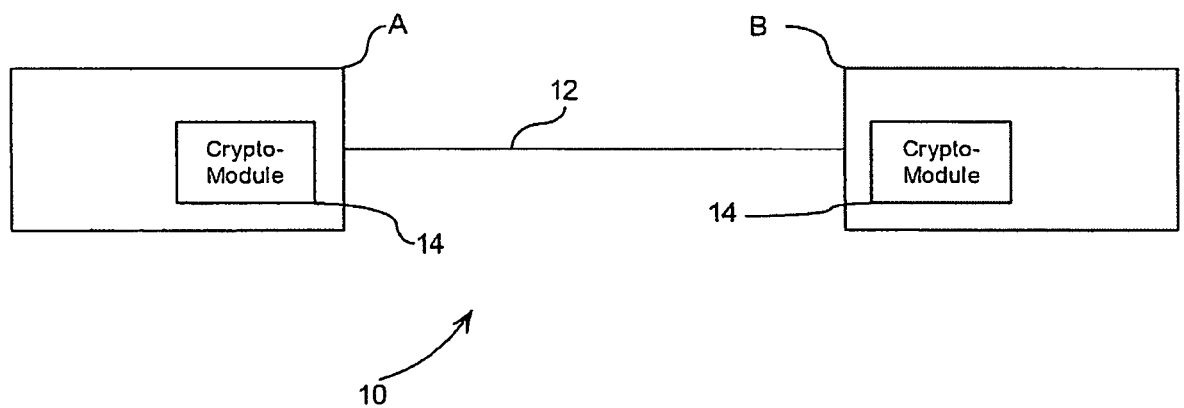
FIG. 1 is a schematic representation of a cryptographic system.

Referring therefore to FIG. 1, a pair of correspondents, A, B are connected by a data communication link 12. Each of the correspondents A, B has a cryptographic unit 14 which performs public key cryptographic operations according to established protocols to permit secure communication over the link 12. The cryptographic units 14 operate within a cryptographic domain whose parameters are shared by other entities.

The domain parameters shared by correspondents A, B include the group G, the order p of the group G and a generator, g, of the group with an order n.

Figure 2:
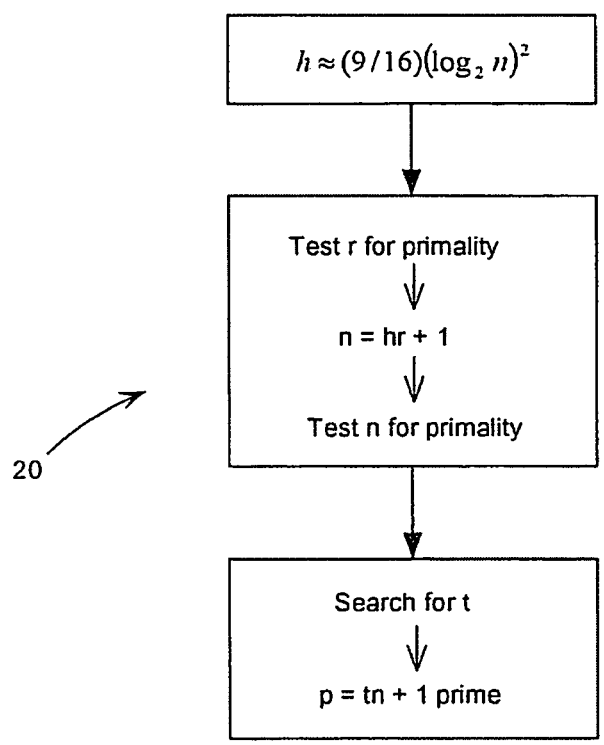
FIG. 2 is a flow chart showing steps in a mod p embodiment.

The invention applies both to elliptic curve groups and to multiplicative subgroups of finite fields, more commonly known as mod p groups. Because mod p groups are easier to understand, the mod p embodiment 20 is explained first and is generally shown in FIG. 2. Aspects of the invention common to both cases can thus be more easily understood. Nevertheless, the preferred embodiment of the invention is with elliptic curve groups because these have several advantages in performance characteristics.

Mod p Embodiment

For simplicity of presentation, we assume that the Diffie-Hellman base or generator g in $Z_p^*$ has an order n that is prime. It will be evident to one skilled in the art that this can be extended to the case in which g has order that is not prime.

The security of the domain name parameters depends on the size of the integer factors u of n−1. If some known factor u is near to $n^{1/3}$, then the above attack 10 has a cost of about $3n^{1/3}$. This is significantly smaller than generic DLP attacks, which have a cost of about $n^{1/2}$. It is known that a random n will generally have a factor u near to $n^{1/3}$, therefore selecting n at random will not avoid the above attack 10. In the prior art, n has generally been chosen as the output of hash function, which makes n effectively random, which will not avoid the attack. By properly selecting n it has been found possible to avoid having a factor near to $n^{1/3}$. It will be appreciated that the selection and testing of the parameters will be conducted using a computing device programmed to perform the necessary computations. The result of such computations is a set of domain parameters that may be used to implement cryptographic functions on the units 14.

In a first embodiment, such a factor is avoided by selecting n=hr+1, where r is prime and h is a relatively small integer compared to r and small enough to be less than $n^{1/3}$. The factors of n−1 are then of the form f or fr, where f is a factor of h. If h is significantly smaller than $n^{1/3}$, then so is factor f, because f is at most h. If h is significantly smaller than $n^{1/3}$, then r is significantly bigger than $n^{2/3}$, so factor fr is significantly bigger than $n^{1/3}$. Therefore all the factors of n−1 will be significantly smaller or bigger than $n^{1/3}$. Therefore the attack on static Diffie Hellman is avoided.

Having chosen n in the form hr+1, it is also necessary to choose p. A standard theorem of group theory is that the order of an element divides the order of its group. Because g is an element of $Z_p^*$, its order n must divide the order of $Z_p^*$, which is p−1. Therefore p=tn+1, for some integer t.

Because groups $Z_p^*$ have index calculus algorithms for solving the DLP, a common practice is to choose p considerably larger than n. The idea is to make the generic DLP solving algorithms in the group <g> of order n have approximately the same cost as the index calculus algorithms in $Z_p^*$. For example, if n is approximately $2^{160}$ and p is approximately $2^{1024}$, then both these DLP solving algorithms have a cost of approximately equivalent to $2^{80}$ group operations. Another common choice for n is about $2^{256}$ and for p about $2^{3072}$ in which both DLP solving algorithms take about $2^{128}$ operations. The main advantage of choosing such a small n is the exponentiation in the group <g> is much faster because the exponents are smaller.

To obtain p and n of sizes related as above, one merely has to choose t of the appropriate size. With the first example, one chooses t about $2^{1024-160}=2864$, and in the second example t is about $2^{2816}$. Because p and n are odd, one needs to choose t to be even. Similar observations about the value t mod 3, t mod 5, and so on can also be made.

The general process is to choose n first, in the form desired, and then to try several values of t until one is found that makes p prime. Rapid tests exist for determining, within a small probability, that p is prime. These tests quickly eliminate candidate values for t that are not prime. Therefore finding a good t is quite rapid. In fact, starting from n, this is the best known way of finding p.

To construct n of the form hr+1, initially an approximate size for h, or an exact value h is selected and then the approximate size of r is determined by the desired approximate size of n. In practise, various h and r in the ranges that have just been determined can be chosen and each examined for suitability. A selected value of r is tested for primality, a value n=hr+1 computed, and then n tested for primality. Sieving techniques can be used to choose r and n that do not have small prime factors such as 2, 3 or 5. This reduces the numbers of value r and n that have be tested for primality. Using h, the sieve can be applied to both n and r together for greater efficiency. It is noted that h must be even because r and n are both prime and therefore odd.

Some care is required in choosing an appropriate size or value for h. The smallest choice is h=2. However, this choice may be too small as although h=2 prevents the above attack, it also prevents the provable security result in applying the present technique.

There is a range for h, in which the above attack will be thwarted while the provable security result is effective. This range depends on the number of group operations needed to perform a scalar multiplication. Optimum value of the h appears to be $(9/16)(\log_2 n)^2$, although values of h in the range 0.5 to 2 times this value may be used. For h of approximately this size, the static Diffie-Hellman problem will be almost as hard as finding the static Diffie-Hellman private key, to within an acceptable factor. This factor may be optimized over all choices of h. Furthermore, with this choice of h, the above attack has cost equivalent to about $n^{1/2}$ group operations. This means that the attack is no longer any better than generic DLP solving algorithms for finding x. In such situation, the attack is therefore not relevant.

In summary, first one chooses an even h in the order of approximately $(9/16)(\log_2 n)^2$, then one searches for r and n using sieving and primality testing on r and n, if n is selected to be prime. Finally one searches for t to find p=tn+1 prime.

An additional efficiency improvement of this method is also possible. In this method, one searches for n and t such that p has a form that makes reduction modulo p more efficient. For example, if p has low Hamming weight, then reduction modulo p is more efficient. This will make modular multiplication, the group operation of $Z_p^*$ much more efficient.

An additional security improvement of this method is also possible. The value of r can be chosen to be verifiably random. The value of r can be chosen as the output of a hash function.

These two additional improvements can be combined by choosing r verifiably at random, and then search for a value t that makes p have efficient modular reduction.

If one is not concerned about the above attack, because such an adversary is unrealistic for a particular implementation of a particular protocol, then one can choose the Diffie-Hellman group differently. It may not be necessary to avoid a factor u of size close $n^{1/3}$, however one still wants both the static Diffie-Hellman problem and the general Diffie-Hellman problem to be hard. To make the static Diffie-Hellman problem hard, one just needs a factor of n−1 of size approximately $(9/16)(\log_2 n)^2$. It is not clear from existing number theory knowledge whether random n will have a factor of such a size. Therefore, one can choose random n and look for such a factor, or, construct n with a factor h of such a size. The latter could be done by choosing h, choosing any r (not necessarily prime), and then testing n=hr+1 for plimality.

To ensure that the ephemeral, or two-sided, Diffie-Hellman problem is hard, one can use existing provable security results. The results of Maurer and Wolf require one to find an auxiliary group, usually an elliptic curve defined over a finite field of size n. The auxiliary group has to have smooth order (no large prime factors). Searching for such an auxiliary group takes considerable effort, and may be out of reach for larger values of n. In fact, it is known that finding such groups is approximately as hard as factor integer of the same size as n.

An older result, of den Boer, says that n−1 is smooth, that the (ephemeral) Diffie-Hellman problem is almost as hard the DLP.

A further enhancement of the present technique therefore includes a method of choosing n=1+s, where s is a smooth integer. This s can be found as a product of small primes such that correct size is obtained. Then n is tested for primality. Several values of s may be tried. A benefit of choosing n in this way, is that generally, it will mean that n−1 has a factor of size close enough to $(9/16)(\log_2 n)^2$, which ensures that the static Diffie-Hellman problem is hard, not just the ephemeral Diffie-Hellman problem.

With such an n, the prime p=tn+1 can be found as above. Furthermore, is also possible with this method to aim for n and p of special structure, such as low Hamming weight.

Elliptic Curve Embodiment

In principle, the technique as described above works for the case of elliptic curve groups as well. More precisely, the desirable criteria for n are identical. However, in this case, the generator g of order n is not an element of $Z_p^*$, but an element of an elliptic curve group E. In the mod p case, once n is determined, it is relatively straightforward to find the group $Z_p^*$. This can not be said for elliptic curves. For a determined n it is still quite difficult to find an elliptic curve group E.

Because elliptic curves make user operations more efficient than for groups $Z_p^*$, the elliptic curve case is the preferred embodiment of the present invention. The methods of this embodiment are slightly more complicated than for the $Z_p^*$ case, but nonetheless are worthwhile.

Figure 3:
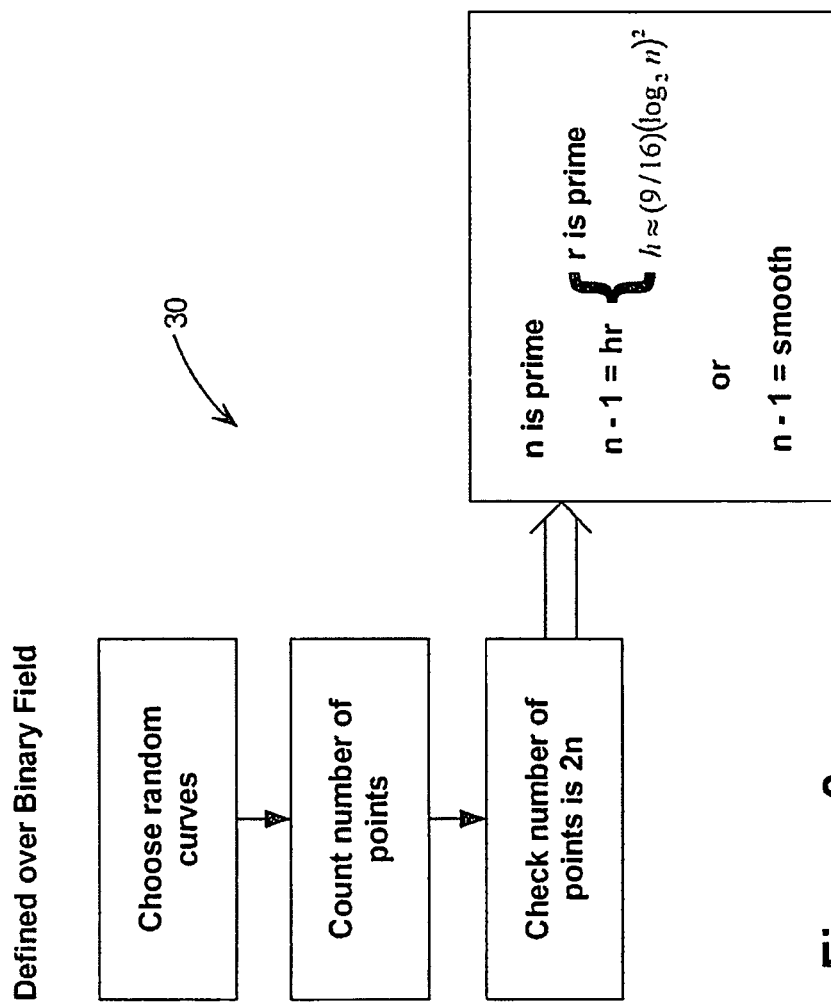
FIG. 3 is a flow chart showing steps in a first simplified elliptic curve embodiment.
Figure 4:
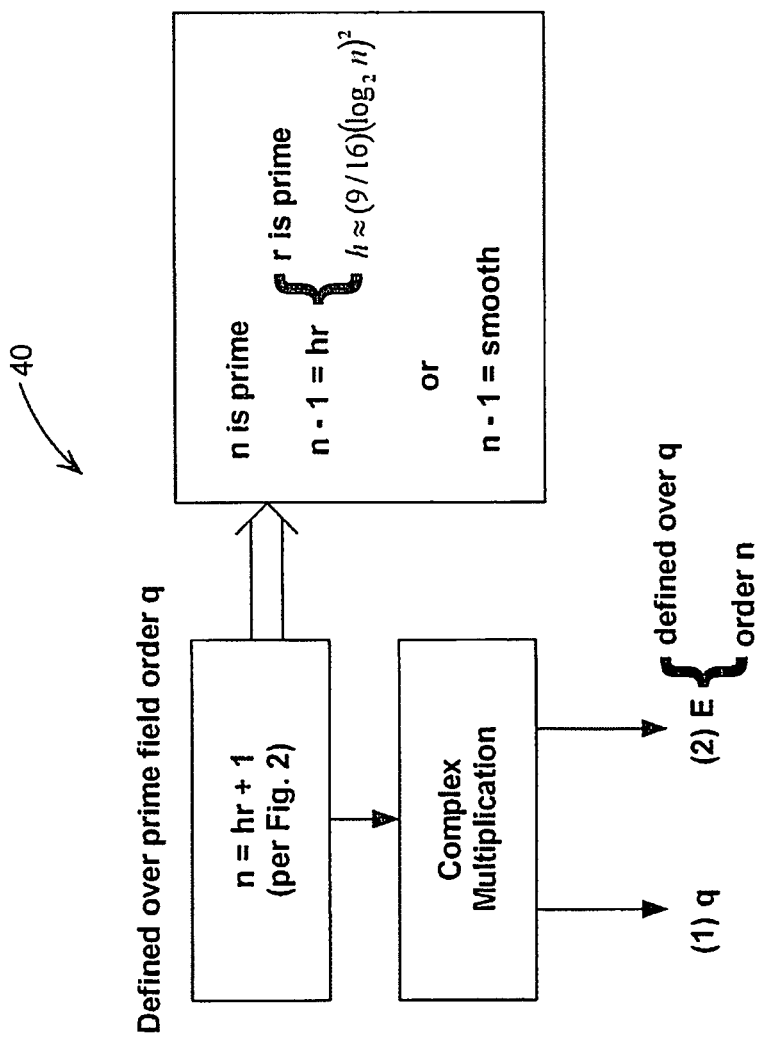
FIG. 4 is a flow chart showing steps in a second simplified elliptic curve embodiment.

For greater clarity of presentation, some simplified forms of the method in the elliptic curve embodiment are presented and shown in FIGS. 3 and 4.

In the first simplified form 30, the elliptic curve will be defined over a binary field. For such curves, determining the order of the elliptic curve group is very easy. The simplified method is to choose random curves, count the number of points, check that the number of points is 2n, where n is prime, and n−1 meets the desired criteria. The preferred criteria are that n−1=hr, where r is prime and h is approximately $(9/16)(\log_2 n)^2$. Alternate criteria are that n−1 is smooth, provided that one does not care about the above attack.

In the second simplified form, the elliptic curve will be defined over a prime field of order q. The value of q will be determined after determining the value of n. The value of n is chosen as above in the case for mod p groups. The value of n can meet the preferred criteria or the alternate criteria. Then, the complex multiplication method as set forth in ANSI x 9.62 or IEEE 13.63 is used to find a value of q and an elliptic curve E defined over q that has an order n.

Usually, the complex multiplication method involves selecting q first, because certain values of q offer better efficiency for users. The complex multiplication method works, however, if n is chosen first. Once q and n have been found with the correct number theoretical relationship, which is the first phase of the complex multiplication method, the second phase determines the coefficients that define the elliptic curve E.

A disadvantage of the second simplified method is that the resulting q will have a form that is more or less random in the Hasse interval of n, which is all integers within about a distance of $n^{1/2}$ from n. For better user efficiency reasons, special forms of q are highly desirable, such as low Hamming weight in binary expansion.

In other words, it is desirable for both q and n to have special forms. The form for q is for efficiency and the form for n is for security. To do this, the first phase of the complex multiplication method is slightly modified. One tries q and n of the special form desired and then tests this pair to see if it meets the condition required by the complex multiplication (CM) method. This condition is a relatively straightforward to test. It is less easy to solve for a n that meets the condition once q is given, or vice versa.

A modification of the first phase of the complex multiplication is to try several different pairs of q and n of the desired form, test the CM method condition for q and n, repeat until the CM condition is met, and then find defining coefficients a and b of the elliptic curve E using the usual process of the CM method.

The CM method is a known method, but its modified form is not. With the modified form of the CM method as described in the preferred embodiment of the present invention, one is able to find highly efficient and highly secure Diffie-Hellman elliptic curve groups.

As an example to demonstrate the viability of this method. Using the alternate criteria, namely that n−1 is smooth, the inventors have found the pair n=1+55 ($2^{286}$) and q=9+55 ($2^{288}$), both of which are primes. One skilled in the art of the CM method will appreciate that the discriminant for this pair is 55. This discriminant is nontrivial in the sense that the Kronecker class number is larger than one, so the endomorphism ring of the elliptic curve is not a unique factorization domain. In particular, this means that coefficients a and b of the elliptic curve E cannot be found from a predetermined table and must be calculated by solving polynomials equations of moderately large degree over the finite field of order q.

As described above, the techniques may be used to generate domain parameters having desirable characteristics. The manner in which these characteristics are generated also lends itself to checking the efficacy of domain parameters supplied by third parties to ensure they are not vulnerable to attack. The parameters may be checked to ensure that the values of p and n satisfy the required form. If they do not meet these criteria, then the domain parameters may be rejected.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What we claim is:

1. A method of establishing an order p of a finite field $Z_p$, and an order n of a subgroup of a multiplicative group $Z_p^*$ of said finite field $Z_p$, the method being performed by a correspondent in a data communication system, the correspondent having a cryptographic unit for performing cryptographic operations, the method comprising the steps of:
   i) the cryptographic unit obtaining a value of n of the form n=hr+1 where h is an integer, r is a prime integer, r is greater than $n^{2/3}$, and all factors of n−1 are significantly smaller or bigger than $n^{1/3}$;
   ii) the cryptographic unit obtaining an even integer t and computing tn+1 to produce a computed value;
   iii) the cryptographic unit checking whether the computed value is prime; and
   iv) the cryptographic unit utilizing the computed value as the prime order p of the finite field if said computed value is prime, and the cryptographic unit utilizing the value n as the order n of the subgroup of the multiplicative group.

2. The method of claim 1 wherein n is required to be prime and further comprising the step of the cryptographic unit checking if n is prime.

3. The method of claim 2 wherein r and n are selected by sieving to exclude values having small primes.

4. The method of claim 2 wherein step i) includes the cryptographic unit first obtaining desired values for n and h, and then computing r to satisfy n=hr+1.

5. The method of claim 1 wherein h is less than $2(9/16)(\log_2 n)^2$.

6. The method of claim 5 wherein h is greater than $0.5(9/16)(\log_2 n)^2$.

7. A non-transitory computer-readable medium having stored thereon computer-executable instructions for performing a method of establishing an order p of a finite field $Z_p$, and an order n of a subgroup of a multiplicative group $Z_p^*$ of said finite field, the method being performed by a correspondent in a data communication system, the correspondent having a cryptographic unit, the computer-executable instructions comprising instructions for:
   the cryptographic unit obtaining a value of n of the form n=hr+1, where h is an integer, r is a prime integer, r is greater than $n^{2/3}$, and all factors of n−1 are significantly smaller or bigger than $n^{1/3}$;
   the cryptographic unit obtaining an even integer t and computing tn+1 to produce a computed value;
   the cryptographic unit checking whether said computed value is prime; and
   the cryptographic unit utilizing said computed value as the prime order p of the finite field if said computed value is prime, and utilizing the value n as the order n of the subgroup of the multiplicative group.

8. The non-transitory computer-readable medium of claim 7 wherein n is required to be prime, the computer-executable instructions further comprising instructions for the cryptographic unit checking if n is prime.

9. The non-transitory computer-readable medium of claim 8, the computer-executable instructions further comprising instructions for the cryptographic unit selecting r and n by sieving to exclude values having small primes.

10. The non-transitory computer-readable medium of claim 8, the computer-executable instructions further comprising instructions for the cryptographic unit first obtaining desired values for n and h, and then computing r to satisfy n=hr+1.

11. The non-transitory computer-readable medium of claim 7 wherein h is less than $2(9/16)(\log_2 n)^2$.

12. The non-transitory, computer-readable medium of claim 11 wherein h is greater than $0.5(9/16)(\log_2 n)^2$.

13. A method of verifying domain parameters for use in a cryptographic system, the method being performed by a correspondent in the cryptographic system and comprising the steps of
   (a) a cryptographic unit of the correspondent checking that n=hr+1, where h is an integer, r is a prime integer, r is greater than $n^{2/3}$, and all factors of n−1 are significantly smaller or bigger than $n^{1/3}$; and
   (b) the cryptographic unit checking that p=tn+1 where t is an even integer.

14. A method for establishing an order of a subgroup of an elliptic curve group, the method being performed by a correspondent in a data communication system, the correspondent having a cryptographic unit for performing cryptographic operations, the method comprising the steps of:
   a) the cryptographic unit obtaining a value n of the form n=hr+1 where h is an integer, r is a prime integer, r is greater than $n^{2/3}$, and all factors of n−1 are significantly smaller or bigger than $n^{1/3}$; and
   b) the cryptographic unit utilizing the value n as the order of the subgroup of the elliptic curve group.

15. The method of claim 14 wherein said value n is prime.

16. The method of claim 15 wherein step a) includes the steps of:
   i) the cryptographic unit generating a random elliptic curve group;
   ii) the cryptographic unit testing whether a prime factor of an order of the elliptic curve group can be expressed as n=hr+1; and
   iii) if the prime factor n can be expressed as n=hr+1, then utilizing said random elliptic curve group as said elliptic curve group.

17. The method of claim 15 further comprising the step of the cryptographic unit using the value n in a complex multiplication algorithm to establish coefficients defining an equation of the elliptic curve group.

18. The method of claim 17 further comprising the step of the cryptographic unit generating an order q of a prime field over which the elliptic curve group is defined, and using the order q and the value n in the complex multiplication algorithm to establish the coefficients defining the equation of the elliptic curve group.

19. The method of claim 18 wherein the cryptographic unit specifies the form of the order q.

20. The method of claim 15 wherein r and n are selected by sieving to exclude values having small primes.

21. The method of claim 15 wherein step a) includes the cryptographic unit first obtaining desired values for n and h, and then computing r to satisfy n=hr+1.

22. The method of claim 14 wherein h is less than $2(9/16)(\log_2 n)^2$.

23. The method of claim 22 wherein h is greater than $0.5(9/16)(\log_2 n)^2$.

24. A non-transitory computer-readable medium having stored thereon computer-executable instructions for performing a method of establishing an order of a subgroup of an elliptic curve group, the method being performed by a correspondent in a data communication system, the correspondent having a cryptographic unit, the computer-executable instructions comprising instructions for:

the cryptographic unit obtaining a value n of the form n=hr+1 where h is an integer, r is a prime integer, r is greater than $n^{2/3}$, and all factors of n−1 are significantly smaller or bigger than $n^{1/3}$; and the cryptographic unit utilizing the value n as the order of the subgroup of the elliptic curve group.

25. The non-transitory computer-readable medium of claim 24 wherein said value n is prime.

26. The non-transitory computer-readable medium of claim 25, the computer-executable instructions further comprising instructions for:

the cryptographic unit generating a random elliptic curve group;

the cryptographic unit testing whether a prime factor of an order of the elliptic curve group can be expressed as n=hr+1; and if the prime factor n can be expressed as n=hr+1, then the cryptographic unit utilizing said random elliptic curve group as said elliptic curve group.

27. The non-transitory computer-readable medium of claim 25, the computer-executable instructions further comprising instructions for the cryptographic unit using the value n in a complex multiplication algorithm to establish coefficients defining an equation of the elliptic curve group.

28. The non-transitory computer-readable medium of claim 27, the computer-executable instructions further comprising instructions for the cryptographic unit generating an order q of a prime field over which the elliptic curve group is defined, and using the order q and the value n in the complex multiplication algorithm to establish the coefficients defining the equation of the elliptic curve group.

29. The non-transitory computer-readable medium of claim 28, the computer-executable instructions further comprising instructions for the cryptographic unit specifying the form of the order q.

30. The non-transitory computer-readable medium of claim 25, the computer-executable instructions further comprising instructions for the cryptographic unit selecting r and n by sieving to exclude values having small primes.

31. The non-transitory computer-readable medium of claim 25, the computer-executable instructions further comprising instructions for the cryptographic unit first obtaining desired values for n and h, and then computing r to satisfy n=hr+1.

32. The non-transitory computer-readable medium of claim 24 wherein h is less than $2(9/16)(\log_2 n)^2$.

33. The non-transitory computer-readable medium of claim 32 wherein h is greater than $0.5(9/16)(\log_2 n)^2$.

* * * * *